United States Patent
Campomizzi et al.

(10) Patent No.: US 7,005,467 B2
(45) Date of Patent: Feb. 28, 2006

(54) ETHYLENE PROPYLENE COPOLYMER COMPOSITION AND PROCESS FOR PRODUCING VULCANIZATES THEREFOR

(75) Inventors: Ezio C. Campomizzi, Sarnia (CA); Harald Bender, Bright's Grove (CA)

(73) Assignee: Bayer Inc., Sarina (CA)

( * ) Notice: Subject to any disclaimer, the term of this patent is extended or adjusted under 35 U.S.C. 154(b) by 0 days.

(21) Appl. No.: 10/354,295

(22) Filed: Jan. 30, 2003

(65) Prior Publication Data

US 2003/0176549 A1   Sep. 18, 2003

Related U.S. Application Data

(62) Division of application No. 09/649,886, filed on Aug. 28, 2000, now abandoned.

(30) Foreign Application Priority Data

Aug. 31, 1999   (CA)   ................................ 2281274

(51) Int. Cl.
*C08K 5/04*   (2006.01)

(52) U.S. Cl. .................. 524/394; 524/417; 524/424

(58) Field of Classification Search ................ 524/424, 524/394, 417
See application file for complete search history.

(56) References Cited

U.S. PATENT DOCUMENTS

| | | | |
|---|---|---|---|
| 3,374,198 A * | 3/1968 | Falcone et al. | 524/388 |
| 3,639,518 A * | 2/1972 | Davies et al. | 524/223 |
| 3,696,059 A * | 10/1972 | Hosoda et al. | 521/81 |
| 3,728,205 A * | 4/1973 | Brindell et al. | 428/97 |
| 3,745,116 A * | 7/1973 | Brindell et al. | 252/1 |
| 3,766,099 A * | 10/1973 | Kawai et al. | 521/98 |
| RE28,070 E * | 7/1974 | Brindell et al. | 524/368 |
| 4,931,499 A * | 6/1990 | Sakai et al. | 525/194 |
| 5,059,648 A * | 10/1991 | Fukushima et al. | 524/376 |
| 5,319,036 A | 6/1994 | DeMarco | 525/366 |
| 5,567,742 A * | 10/1996 | Park | 521/143 |
| 5,631,313 A * | 5/1997 | Bishop et al. | 524/45 |
| 5,783,640 A * | 7/1998 | Sandstrom et al. | 525/329.3 |

FOREIGN PATENT DOCUMENTS

| | | | |
|---|---|---|---|
| JP | 10017722 A | * | 1/1998 |
| JP | 10076619 A | * | 3/1998 |
| JP | 10237422 A | * | 9/1998 |
| TW | 247295 A | * | 5/1995 |

OTHER PUBLICATIONS

Whela, "Polymer Technology Dictionary", 2nd ed., Chapman & Hall, New York, p. 139 (1994).*

"Hawley's Condensed Chemical Dictionary", 12$^{th}$ ed., Lewis, Sr., ed., Van Nostrand Reinhold Co., New York, p. 309 (1993).*

* cited by examiner

*Primary Examiner*—Bernard Lipman
(74) *Attorney, Agent, or Firm*—Jennifer R. Beng

(57) ABSTRACT

A polymer composition useful to produce a vulcanizate having improved hot air aging properties is described. The polymer composition includes two components. The first component is a polymer having a main polymer chain derived from: (i) at least about 30% by weight of a first monomer which introduces at least one of a secondary carbon and a tertiary carbon to the backbone, and (ii) from 0 to about 70% by weight of at least one other monomer. The second component is a salt of a strong base and a weak acid, the salt comprising a metal selected from Group I of the Periodic Table of Elements. The polymer compositions may further comprise optional ingredients such as one or more of: a vulcanization system, a polycarbodiimide and a filler.

1 Claim, 1 Drawing Sheet

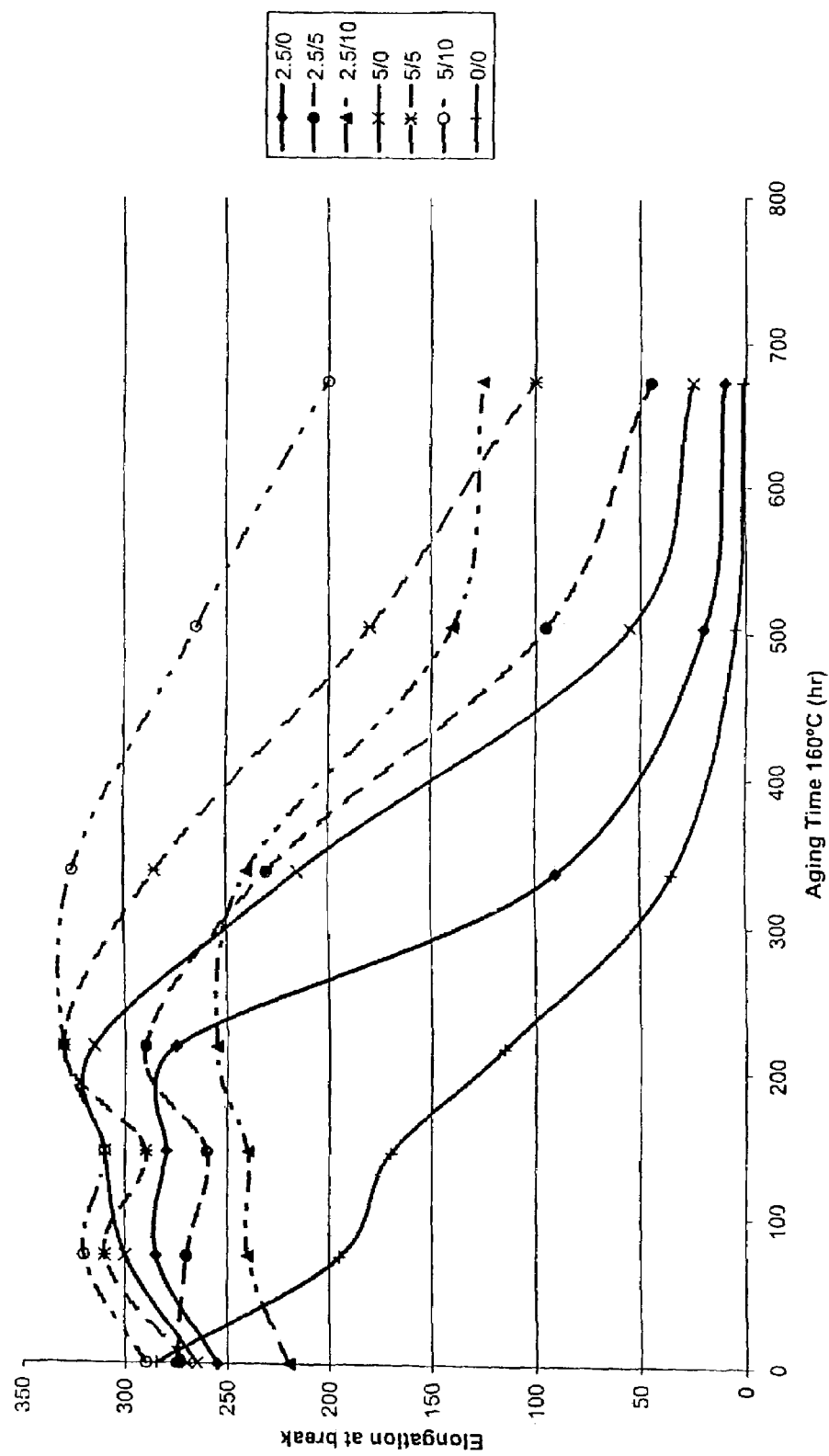

ETHYLENE PROPYLENE COPOLYMER COMPOSITION AND PROCESS FOR PRODUCING VULCANIZATES THEREFOR

This application is a division of Ser. No. 09/649,886, filed Aug. 28, 2000, now abandoned.

FIELD OF THE INVENTION

The present invention relates to an improved polymer composition and to a process for producing vulcanizates thereof. More particularly, in one of its aspects, the present invention relates to a rubber composition having improved hot air aging characteristics. In yet another of its aspects, the present invention relates to a method for improving the hot air aging characteristics of a polymer vulcanizate.

BACKGROUND OF THE INVENTION

The effects of oxidizing conditions on vulcanizates obtained from polymers have long been a problem, particularly in applications where the vulcanizates are exposed to elevated temperatures for extended periods of time. A variety of approaches have been developed in the art in an attempt to solve this problem.

It is known that, in compositions comprising polymers based on a monomer which results in a polymer backbone having repeating units including at least one carbon-hydrogen bond (i.e., repeating units have a secondary or tertiary carbon), thermo-oxidative attack initiated by a radical mechanism is very relevant in the deterioration of the useful properties of such compositions during oxidative aging. See, for example:

1. S. Bhattacharjee, A. K. Bhowmick and B. N. Avasthi: "Degradation of Hydrogenated Nitrile Rubber"; Polymer Degradation and Stability, 31, 71–87 (1991); and
2. K. C. Smith and B. S. Tripathy: "HNBR and Long Term Serviceability in Modern Automotive Lubricants"; Rubber World, 217 (5), 28–45 (1998).

During the oxidative degradation process located at such carbon-hydrogen bonds among other substances hydroperoxide, alcohol, keto, aldehyde and carboxylic acid functionalities are introduced into the main polymer chain (also referred to as the "polymer backbone"). This often results in polymer chain scission or crosslinking reactions which lead to changes and deterioration of the useful properties of the composition such as tensile strength, hardness, static and dynamic stiffness, elongation at break, compression set etc.

Thermo-oxidative reactions as described above are autocatalytic chain reactions, where reactive radicals are regenerated within the reaction cascade. It is known in the art to add substances (often called antioxidants) to polymer compositions to facilitate destruction of radicals or reactive intermediates produced during the polymer oxidation process (such as hydroperoxides) thereby improving the oxidative heat aging resistance of the compositions.

Non-limiting examples of useful antioxidants may be selected from the group including hindered phenols, p-phenylene diamine derivatives, quinoline derivatives and mixtures thereof. Phosphites, dithiophosphates, dithiocarbamates and mercaptoimidazole derivatives are also commonly employed as antioxidants. These substances often either donate hydrogen atoms to other radicals and, during the polymer oxidation process, they:

(i) are converted into unreactive radicals themselves;
(ii) block certain reactions which lead to the production of free radicals (e.g., heavy metal trapping); and/or
(iii) favor reactions of reactive intermediates leading to the production of non-radical reaction products (e.g., hydroperoxide decomposer).

In many cases, to achieve their desired properties, rubber compositions are cured with a crosslinking system conventionally selected from the group comprising sulfur, sulfur donor compounds and/or a peroxide system. It is known in the art that interference of antioxidants with cure systems often presents a major problem. Reaction of antioxidants with cure systems may lead to significant deterioration of the desired state of cure of the composition. Complete or partial depletion of the antioxidant in the composition during cure is likely to occur when the cure system generates radicals during vulcanization.

SUMMARY OF THE INVENTION

Accordingly, there remains a need in the art to improve antioxidant systems in a way that they offer desirable oxidative heat aging protection without deleterious interference with cure systems and, importantly, without partial or complete loss of antioxidant activity due to chemical reaction at the vulcanization stage.

It is an object of the present invention to obviate or mitigate at least one of the above-mentioned disadvantages of the prior art.

It is another object of the present invention to provide a novel polymer composition.

It is yet another object of the present invention to provide a novel process for producing a polymer vulcanizate.

It is yet another object of the present invention to provide a novel method for improving the hot air aging characteristics of a polymer vulcanizate.

Accordingly, in one of its aspects, the present invention provides a polymer composition comprising:

a polymer having a main polymer chain derived from: (i) at least about 30% by weight of a first monomer which introduces at least one of a secondary carbon and a tertiary carbon to the main polymer chain, and (ii) from 0 to about 70% by weight of at least one other monomer; and a salt of a strong base and a weak acid, the salt comprising a metal selected from Group I of the Periodic Table of Elements.

In another of its aspects, the present invention provides a method for improving the hot air aging characteristics of a polymer comprising the steps of:

admixing: (A) a polymer having a main polymer chain derived from: (i) at least about 30% by weight of a first monomer which introduces at least one of a secondary carbon and a tertiary carbon to the main polymer chain, and (ii) from 0 to about 70% by weight of at least one other monomer; and (B) a salt of a strong base and a weak acid, the salt comprising a metal selected from Group I of the Periodic Table of Elements; and vulcanizing the polymer composition.

BRIEF DESCRIPTION OF THE DRAWINGS

The FIGURE illustrates the synergistic effect of $Na_2CO_3$/Carbodiimide.

DETAILED DESCRIPTION OF THE INVENTION

Thus, it has been discovered that incorporation of a particular additive in a polymer composition results in a surprising and unexpected improvement in the oxidative heat aging resistance of the composition while obviating or mitigating a deleterious effect on the action of a vulcanization system used to cure the polymer composition. The particular additive is a salt of a strong base and a weak acid, the salt comprising a metal selected from Group I of the Periodic Table of Elements.

The present polymer composition is useful to produce a vulcanizate having improved physical properties. More specifically, the vulcanizates produced from the present polymer composition may be characterized by improvement (i.e., in comparison to a vulcanizate produced without the additive) in one or more of the following properties:
- hot air aging;
- hot fluid aging;
- aged compression set;
- aged dynamic elastic modulus (E);
- aged dynamic viscous modulus (E);
- aged static modulus; and
- aged low temperature properties.

Even more specifically, the vulcanizates produced from the present polymer composition have improved hot air aging. This results in a slowing of polymer deterioration and can be accompanied by improvement in one or more of the other properties listed above.

Embodiments of the present invention will be described with reference to the accompanying FIGURE in which there is illustrated comparative hot air aging characteristics between polymer vulcanizates of the invention and a conventional polymer vulcanizate.

Thus, the present polymer composition comprises two components.

The first component of the present polymer composition is a polymer having a main polymer chain derived from: (i) at least about 30% by weight of a first monomer which introduces at least one of a secondary carbon and a tertiary carbon to the main polymer chain, and (ii) from 0 to about 70% by weight of at least one other monomer.

As used throughout this specification, the term "polymer" is intended to have a broad meaning and is meant to encompass any polymer having a main polymer chain which comprises at least one secondary or tertiary carbon. Those of skill in the art will understand that a secondary carbon is a carbon atom having two hydrogen atoms bonded to it while a tertiary carbon is a carbon atom having one hydrogen atom bonded to it. The polymer may be a homopolymer, a copolymer, a terpolymer and the like. Also, it is possible to use a mixture of polymers provided at least one polymer in the mixture has the polymer main chain properties described above.

The polymer suitable for use herein may be an elastomer (e.g., a hydrocarbon rubber), a graft polymer or block polymer of monomers having at least one ethylenically unsaturated bond and polymerizable through this unsaturation, and the like.

Elastomers are well known to those of skill in the art. Non-limiting examples of suitable elastomers may be selected from the group comprising natural rubber (NR), cis-1,4-polyisoprene rubber (IR), polybutadiene rubber (BR), styrene-butadiene rubber (SBR), acrylonitrile-butadiene rubber (NBR), hydrogenated acrylonitrile-butadiene rubber (HNBR), other HNBR copolymers, HNBR terpolymers (including hydrogenated acrylonitrile, butadiene, unsaturated carboxylic acid ester terpolymers), ethylene-propylene monomer rubber (EPM), ethylene-propylene-diene monomer rubber (EPDM), ethylene-vinyl acetate rubber (EVM) and the like.

Of course, subject to compatibility, mixtures of two or more of any of the foregoing polymers may be used herein.

Preferably, the polymer used in the present polymer composition is an elastomer. More preferably, the elastomer is selected from the group comprising:
- ethylene-propylene copolymer;
- ethylene-propylene-non conjugated diene terpolymer;
- ethylene vinyl acetate copolymer;
- unsaturated nitrile/conjugated diene copolymer;
- hydrogenated unsaturated nitrile/conjugated diene copolymer;
- unsaturated nitrile/conjugated diene/ethylenically unsaturated monomer terpolymer;
- hydrogenated unsaturated nitrile/conjugated diene/ethylenically unsaturated monomer terpolymer;
- stryrene/conjugated diene copolymer;
- hydrogenated stryrene/conjugated diene copolymer;
- polyisoprene
- natural rubber;
- polybutadiene;
- and mixtures thereof.

These elastomers are well known in the art and are readily available to or may be produced by a person of skill in the art.

It is known in the art that elastomers, such as the preferred elastomers listed above, may contain small amounts of antioxidants (typically less than 0.5 parts by weight), which are added during the manufacturing process of the polymers mainly to increase their shelf life.

The second component is a salt of a strong base and a weak acid, the salt comprising a metal selected from Group I of the Periodic Table of Elements.

Non-limiting examples of the weak acids useful in the production of the above-mentioned salt may be selected from the group comprising carbonic acid, $C_1$–$C_{50}$ fatty acids, ethylene diamine tetra(acetic acid), phosphoric acid and mixtures thereof. The preferred salt for use in the present polymer composition may be selected from the group comprising sodium carbonate, potassium carbonate, sodium stearate, potassium stearate and mixtures thereof. The most preferred salt for use in the present polymer composition is sodium carbonate.

Preferably, the salt is present in the polymer composition in an amount in the range of from about 0.5 to about 50 parts by weight, preferably in the range of from about 1 to about 20 parts by weight, most preferably in the range of from about 2.5 to about 7.5 parts by weight.

Optionally, the present polymer composition further comprises a carbodiimide, a polycarbodiimide or mixtures thereof. The preferred carbodiimide is available commercially under the tradenames Rhenogram™ P50 (a trademark of Rhein Chemie Rheinau GmbH) and Stabaxol™ P (a registered trademark of Bayer AG). This ingredient may be used in the present polymer composition in an amount in the range of from 0 to about 15 parts by weight, more preferably in the range of from 0 to about 10 parts by weight, even more preferably in the range of from about 0 to about 2 parts by weight.

Preferably, the present polymer composition further comprises a vulcanization system. The choice and amount of vulcanization system depends on a number of factors, including the choice of polymer component, the intended application of the vulcanizate and the like.

Preferably, the vulcanization system is selected from the group comprising sulfur, a sulfur donor cure system and a peroxide compound.

Non-limiting examples of useful sulfur donor cure systems may be selected from the group comprising thiuram compounds (such as tetramethyl thiuram disulfide, tetraethyl thiuram disulfide, tetramethyl thiuram monosulfide and the like), and morpholine compounds (such as morpholine disulfide and the like). Further, it is possible to use dithiobis (caprolactam) in a sulfur donor cure system. The useful amount of sulfur or the sulfur-donating compound preferably is in the range of from about 0.1 to about 5 parts by weight.

As is known in the art, when the vulcanization agent is sulfur or a sulfur donor cure system, it is conventional to include a vulcanization accelerator. Non-limiting examples of useful vulcanization accelerators may be selected from the group comprising thiazole compounds (such as 2-mercaptobenzothiazole [MBT], dithiobis mercaptobenzothiazole [MBTS] and the like), sulfenamide compounds (such as N-cyclohexyl-2-benzothiazyl sulfenamide and the like), dithiocarbamates (such as zinc-dibutyl dithiocarbamate) and mixtures thereof. Such vulcanization accelerators are preferably used in an amount in the range of 0.5 to 5 parts by weight. Further, it is known to use metal oxides such as zinc oxide, magnesium oxide and the like, as well as acids such as stearic acid, cure activators in these vulcanization systems.

As stated above, the vulcanization system may comprise a peroxide compound, preferably an organic peroxide. Non-limiting examples of useful organic peroxide compounds may be selected from the group comprising dicumyl peroxide, benzoyl peroxide, 2,5-dimethyl-2,5-di(t-butylperoxy)-hexane, 2,2'-bis(tert-butylperoxydiisopropyl benzene, t-butyl peroxybenzoate and the like. Other useful peroxide compounds will be immediately apparent to those of skill in the art. The organic peroxide used is preferably in the range of from about 0.5 to about 15 parts by weight, preferably in the range of from about 2 to about 8 parts by weight.

When the vulcanization system comprises an organic peroxide, it is known to include a coagent together therewith. Preferably, the coagent acts as a polyfunctional monomer. Non-limiting examples of suitable such coagents may be selected from the group comprising triallyl cyanurate, triallyl isocyanurate, trimethylolpropane trimethacrylate, ethylene dimethacrylate, toluylene bismaleimide and the like. Preferably, the coagent is used in an amount in the range of from about 1 to about 10 parts by weight.

Preferably, the present polymer composition comprises a filler. The nature of the filler is not particularly restricted and the choice of suitable fillers is within the purview of a person skilled in the art. Non-limiting examples of suitable fillers include carbon black (e.g., FEF, MT, GPF and SRF), clays, titanium dioxide, silica fillers (with or without unsaturated silanes), calcium carbonate, talc (magnesium silicate) and the like. The amount of filler is conventional. Preferably, the filler is present in an amount in the range of from about 20 to about 200 parts by weight per hundred parts by weight of the polymer. More preferably, the filler is present in an amount in the range of from about 20 to about 100 parts by weight per hundred parts by weight of the polymer. Most preferably, the filler is present in an amount in the range of from about 40 to about 80 parts by weight per hundred parts by weight of the polymer.

In the present process, the polymer, the filler (as noted above, the use of a filler is optional), the additive and the vulcanization system may be admixed in any conventional manner known to the art. For example, this polymer composition may be admixed on a two-roll rubber mill or an internal mixer.

Thus, the polymer composition is mixed in a conventional manner and the temperature thereof during mixing is maintained as is known in the art.

In the present process, it is preferred to heat the polymer composition to form vulcanizates using conventional procedures well known in the art. Preferably, the polymer composition is heated to a temperature in the range of from about 130° to about 200° C., preferably from about 140° to about 190° C., more preferably from about 150° to about 180° C.

Preferably, the heating is conducted for a period of from about 1 minute to about 15 hours, more preferably from about 5 minutes to about 30 minutes. Various methods of post cure, as is well known in the art, may be used to complete the vulcanization step.

In many cases, the present polymer composition will further comprise an antioxidant. Non-limiting examples of useful antioxidant compounds may be selected from the group comprising alkylated diphenylamines (such as styrenated diphenyl amine and the like), quinoline-type stabilizers (such as 2,2,4-trimethyl-1,2-dihydroquinoline polymer and the like), mercaptobenzimidazoles (such as zinc salts of methylmercaptobenzimidale) and the like. With sulfur-containing vulcanization systems, phenylene diamine derivatives (such as N-phenyl-N'-isopropyl-p-phenylene diamine and the like), as well as sterically hindered phenols (such as butylated hydroxy toluene and the like) can also be used. The amount of antioxidant used is within the purview of a person skilled in the art.

Other conventional compounding ingredients may also be included by mixing with the copolymer in the conventional manner. Such other compounding ingredients are used for their conventional purposes and include activators such as zinc oxide and magnesium oxide; stearic acid; plasticizers; processing aids; reinforcing agents; promoters and retarders in amounts well known in the art.

During production of the vulcanizate from the polymer composition, the vulcanizate may be formed into a composite with, for example, polyester fiber, nylon fiber aramide fiber, glass fiber, carbon fiber, steel fiber cords or fabrics and the like, whereby a desired rubber composite product is obtained.

Embodiments of the present invention will be illustrated with reference to the following Examples, which are provided for illustrative purposes and should not be used to limit the scope of the invention. Unless otherwise stated, all parts in the Examples are parts by weight.

Further, in the Examples, the materials used include the following:

Therban™ A3907: a hydrogenated nitrile butadiene polymer commercially available from Bayer Inc.;

Therban™ A3407: a hydrogenated nitrile butadiene polymer commercially available from Bayer Inc.;

Therban™ VPKA8798: a hydrogenated acrylonitrile, butadiene, unsaturated carboxylic acid ester terpolymer commercially available from Bayer Inc.;

Buna™ EP T2070: a copolymer of ethylene and propylene commercially available from Bayer Inc.;

Buna™ EP T6850: a terpolymer of ethylene, propylene and 5-ethylidene-2-norbornene, commercially available from Bayer Inc.;

Levaprenu Lev 500HV: ethylene vinyl acetate commercially available from Bayer Inc.;

Natural rubber (pale crepe);

Dynamar™ RC5251Q: sodium carbonate commercially available from Dyneon;

Rhenogran™ P50: polycarbodiimide commercially available from Rhein Chemie Corporation;

Maglite™ D: magnesium oxide, activator, commercially available from CP Hall;

Stearic acid, Emersol™ 132NF: dispersing agent;

Zinc oxide: activator;

Carbon black, N660 Sterling-V: filler

Armeen™ 18D: 1-octadecanamine commercially available from Akzo Nobel Chemicals;

Naugard™ 445: antioxidant commercially available from UniRoyal Chemicals;

Vulkanox™ OCD/SG: antidegradant commercially available from Bayer Inc.;

Vukanox™ ZMB-2/C5: antidegradant commercially available from Bayer Inc.;

Sunpar™ 2280: paraffinic oil commercially available from Sun Refining;

Plasthall TOTM: plasticizer commercially available from CP Hall;

Diak #7: triallyl isocyanate, cross-linking activator, commercially available from E. I. DuPont; and Vulcup™ 40KE: 2,2'-bis(tert-butylperoxy diisopropyl-benzene commercially available from Hercules;

Sulfur: vulcanizing agent;

Sulfasan DTDM: 4,4'-dithiodimorpholine commercially available from FLEXSYS America; and Vulkacit™ Thiuram/C: tetramethyl thiuram disulfide vulcanizing agent commercially available from Bayer Inc.

The invention is further illustrated but is not intended to be limited by the following examples in which all parts and percentages are by weight unless otherwise specified.

EXAMPLES 1–4

The following procedure was used for each of Examples 1–4. The polymer composition used in Examples 1–4 are shown in Table 1.

As will be apparent to those of skill in the art, the polymer composition of Examples 1 and 3 contained no special additive. Accordingly, Examples 1 and 3 are provided for comparison purposes only and are outside the scope of the present invention. As will be further apparent to those of skill in the art Examples 1 and 2 relate to a vulcanizate derived using a peroxide curing system whereas those of Examples 3 and 4 relate to vulcanizate derived using a sulfur donor curing system.

The components of the polymer composition were mixed in a Banbury mixer using conventional techniques. The polymer composition was vulcanized at 170° C. for a period of 15, 12, 8 and 8 minutes, respectively, for each of Examples 1–4.

The elongation at break of the vulcanizates was determined in accordance with ASTM D412–80. Hardness properties were determined using a Type A Shore durometer in accordance with ASTM-D2240–81. The properties of the vulcanizates of Examples 1 and 2 are reported in Table 2 while those of Examples 3 and 4 are reported in Table 3.

The properties of the vulcanizates reported in Tables 2 and 3 clearly illustrate the superiority of the hot air aging characteristics of the vulcanizates of Examples 2 and 4 (special additive used) when compared to the vulcanizate of Examples 1 and 3 (special additive not used), respectively. This translates into significant practical advantages in many of the conventional applications of the vulcanizates.

EXAMPLES 5–8

The methodology used in Examples 1–4 was repeated in these Examples using the polymer compositions reported in Table 4. The polymer composition was vulcanized at 170° C. for a period of 18, 18, 25 and 26 minutes, respectively, for each of Examples 5–8.

As will be apparent to those of skill in the art, the polymer composition of Examples 5 and 7 contained no special additive. Accordingly, Examples 5 and 7 are provided for comparison purposes only and are outside the scope of the present invention. As will be further apparent to those of skill in the art, Examples 5 and 6 relate to a vulcanizate derived from EP copolymer whereas those of Examples 7 and 8 relate to a vulcanizate derived from EPDM terpolymer.

Various physical properties of the vulcanizates were determined as described in Examples 1–4. These properties are reported in Table 4 for Examples 5 and 6, and in Table 5 for Examples 7 and 8.

The properties of the vulcanizates reported in Tables 5 and 6 clearly illustrate the superiority of the hot air aging characteristics of the vulcanizates of Examples 6 and 8 (special additive used) when compared to the vulcanizate of Examples 5 and 7 (special additive not used), respectively. This translates into significant practical advantages in many of the conventional applications of the vulcanizates.

EXAMPLES 9–12

The methodology used in Examples 1–4 was repeated in these Examples using the polymer compositions reported in Table 7. The polymer composition was vulcanized at 180° C. for a period of 12, 12, 13 and 13 minutes, respectively, for each of Examples 9–12.

As will be apparent to those of skill in the art, the polymer composition of Examples 9 and 11 contained no special additive. Accordingly, Examples 9 and 11 are provided for comparison purposes only and are outside the scope of the present invention. As will be further apparent to those of skill in the art, Examples 9 and 10 relate to a vulcanizate derived from a hydrogenated nitrile butadiene polymer whereas those of Examples 11 and 12 relate to a vulcanizate derived from a hydrogenated acrylonitrile, butadiene, unsaturated carboxylic acid ester terpolymer.

Various physical properties of the vulcanizates were determined as described in Examples 1–4. These properties are reported in Table 8 for Examples 9 and 10, and in Table 9 for Examples 11 and 12.

The properties of the vulcanizates reported in Tables 8 and 9 clearly illustrate the superiority of the hot air aging characteristics of the vulcanizates of Examples 10 and 12 (special additive used) when compared to the vulcanizate of Examples 9 and 11 (special additive not used), respectively. This translates into significant practical advantages in many of the conventional applications of the vulcanizates.

EXAMPLES 13–19

The methodology used in Examples 1–4 was repeated in these Examples using the polymer compositions reported in Table 10.

As will be apparent to those of skill in the art, the polymer composition of Example 19 contained no special additive. Accordingly, Example 19 is provided for comparison purposes only and is outside the scope of the present invention.

Various physical properties of the vulcanizates were determined as described in Examples 1–4. These properties are reported in Tables 11 and 12, and are illustrated in the accompanying FIGURE.

The properties of the vulcanizates reported in Tables 8 and 9 clearly illustrate the superiority of the hot air aging characteristics of the vulcanizates of Examples 13–18 (special additive used) when compared to the vulcanizate of Example 19 (special additive not used), respectively. The accompanying FIGURE is particularly instructive in showing the significant relative improvement in the time needed for the aged vulcanizate to reach 100% elongation at break under the test conditions.

Additionally, these results illustrate the synergistic benefit of using a polycarbodiimide as an adjunct to the special additive. In this regard, reference can be made to a comparison of the properties for Example 13 with those of Examples 14 and 15, and to a comparison of the properties for Example 16 with those of Examples 17 and 18, particularly at longer aging periods. This translates into significant practical advantages in many of the conventional applications of the vulcanizates.

EXAMPLES 20–21

The methodology used in Examples 1–4 was repeated in these Examples using the polymer compositions reported in Table 13. The polymer composition was vulcanized at 180° C. for a period of 17 minutes in each Example.

As will be apparent to those of skill in the art, the polymer composition of Example 20 contained no special additive. Accordingly, Example 20 is provided for comparison purposes only and is outside the scope of the present invention. As will be further apparent to those of skill in the art, Examples 20 and 21 relate to a vulcanizate derived from an ethylene vinyl acetate copolymer.

Various physical properties of the vulcanizates were determined as described in Examples 1–4. These properties are reported in Table 14. The properties of the vulcanizates reported in Table 14 clearly illustrates the superiority of the hot air aging characteristics of the vulcanizates of Example 21 (special additive used) when compared to the vulcanizate of Examples 20 (special additive not used). This translates into significant practical advantages in many of the conventional applications of the vulcanizates.

TABLE 1

| Ingredient | Example 1 | Example 2 | Example 3 | Example 4 |
|---|---|---|---|---|
| Natural Rubber | 100 | 100 | 100 | 100 |
| Naugard ™ 445 | 1.1 | 1.1 | 1.1 | 1.1 |
| Vulkanox ™ ZMB-2/C5 (ZMMBI) | 0.4 | 0.4 | 0.4 | 0.4 |
| Dynamar ™ RC-5251Q | — | 5 | — | 5 |
| Maglite ™ D | 3 | 3 | 3 | 3 |
| Stearic Acid, Emersol ™ 132 NF | 3 | 3 | 3 | 3 |
| Zinc Oxide | 5 | 5 | 5 | 5 |
| Carbon Black, N660 Sterling-V | 50 | 50 | 50 | 50 |
| Sunpar ™ 2280 | 10 | 10 | 10 | 10 |
| Diak #7 | 1.5 | 1.5 | — | — |
| Vulcup 40KE | 3.5 | 3.5 | — | — |
| Sulfasan DTDM | — | — | 2 | 2 |
| Sulfur | — | — | 0.3 | 0.3 |
| Vulkacit Thiuram/C (D) | — | — | 2 | 2 |

TABLE 2

| Physical Properties | Example 1 | Example 2 | % Change 1 | % Change 2 |
|---|---|---|---|---|
| Unaged | | | | |
| Elongation at break | 325 | 360 | — | — |
| Hardness, Shore A | 48 | 48 | | |
| Aged 4 h @ 110° C. | | | | |
| Elongation at break | 380 | 385 | 16.9 | 6.9 |
| Hardness, Shore A | 53 | 53 | | |
| Aged 240 h @ 110° C. | | | | |
| Elongation at break | 245 | 295 | −24.6 | −18.1 |
| Hardness, Shore A | 52 | 52 | | |
| Aged 504 h @ 110° C. | | | | |
| Elongation at break | 135 | 260 | −58.5 | −27.8 |
| Hardness, Shore A | 52 | 47 | | |
| Aged 1008 h @ 110° C. | | | | |
| Elongation at break | 2 | 200 | −99.4 | −44.4 |
| Hardness, Shore A | 82 | 46 | | |
| Aged 240 h @ 120° C. | | | | |
| Elongation at break | 190 | 320 | −41.5 | −11.1 |
| Hardness, Shore A | 46 | 45 | | |
| Aged 504 h @ 120° C. | | | | |
| Elongation at break | 1 | 150 | −99.7 | −58.3 |
| Hardness, Shore A | 76 | 40 | | |
| Aged 1008 h @ 120° C. | | | | |
| Elongation at break | 1 | 70 | −99.7 | −80.6 |
| Hardness, Shore A | 78 | 54 | | |

TABLE 3

| Physical Properties | Example 3 | Example 4 | % Change 3 | % Change 4 |
|---|---|---|---|---|
| Unaged | | | | |
| Elongation at break | 220 | 230 | — | — |
| Hardness, Shore A | 60 | 60 | | |
| Aged 4 h @ 110° C. | | | | |
| Elongation at break | 200 | 220 | −9.1 | −4.3 |
| Hardness, Shore A | 65 | 63 | | |
| Aged 240 h @ 110° C. | | | | |
| Elongation at break | 120 | 130 | −45.5 | −43.5 |
| Hardness, Shore A | 67 | 67 | | |
| Aged 504 h @ 110° C. | | | | |
| Elongation at break | 5 | 80 | −97.7 | −65.2 |
| Hardness, Shore A | 70 | 66 | | |
| Aged 1008 h @ 110° C. | | | | |
| Elongation at break | 2 | 50 | −99.1 | −78.3 |
| Hardness, Shore A | 86 | 73 | | |
| Aged 240 h @ 120° C. | | | | |
| Elongation at break | 40 | 115 | −81.8 | −50 |
| Hardness, Shore A | 66 | 62 | | |
| Aged 504 h @ 120° C. | | | | |
| Elongation at break | 1 | 40 | −99.5 | −82.6 |
| Hardness, Shore A | 72 | 71 | | |

TABLE 4

| Ingredient | Example 5 | Example 6 | Example 7 | Example 8 |
|---|---|---|---|---|
| Buna ™ EP T2070 | 100 | 100 | — | — |
| Buna ™ EP T6850 | — | — | 100 | 100 |
| Dynamar ™ RC-5251Q | — | 5 | — | 5 |
| Maglite ™ D | 3 | 3 | 3 | 3 |
| Naugard ™ 445 | 1.1 | 1.1 | 1.1 | 1.1 |
| Stearic Acid, Emersol ™ 132 NF | 1 | 1 | 1.5 | 1.5 |
| Vulkanox ™ ZMB-2/C5 (ZMMBI) | 0.4 | 0.4 | 0.4 | 0.4 |
| Zinc Oxide | 3 | 3 | 5 | 5 |
| Carbon Black, N660 Sterling-V | 50 | 50 | 50 | 50 |
| Sunpar ™ 2280 | 10 | 10 | 10 | 10 |
| Diak #7 | 1.5 | 1.5 | 1.5 | 1.5 |
| Vulcup 40KE | 7.5 | 7.5 | 3.5 | 3.5 |

TABLE 5

| Physical Properties | Example 5 | Example 6 | % Change 5 | % Change 6 |
|---|---|---|---|---|
| Unaged | | | | |
| Elongation at break | 280 | 250 | — | — |
| Hardness, Shore A | 64 | 66 | | |
| Aged 240 h @ 160° C. | | | | |
| Elongation at break | 335 | 360 | 19.6 | 44 |
| Hardness, Shore A | 71 | 75 | | |
| Aged 504 h @ 160° C. | | | | |
| Elongation at break | 285 | 345 | 1.8 | 38 |
| Hardness, Shore A | 73 | 72 | | |
| Aged 1008 h @ 160° C. | | | | |
| Elongation at break | 85 | 190 | −69.6 | −24 |
| Hardness, Shore A | 73 | 76 | | |

TABLE 6

| Physical Properties | Example 7 | Example 8 | % Change 7 | % Change 8 |
|---|---|---|---|---|
| Unaged | | | | |
| Elongation at break | 380 | 350 | — | — |
| Hardness, Shore A | 61 | 59 | | |
| Aged 240 h @ 160° C. | | | | |
| Elongation at break | 210 | 270 | −44.7 | −22.9 |
| Hardness, Shore A | 75 | 70 | | |
| Aged 504 h @ 160° C. | | | | |
| Elongation at break | 60 | 160 | −84.2 | −54.3 |
| Hardness, Shore A | 75 | 75 | | |
| Aged 1008 h @ 160° C. | | | | |
| Elongation at break | 1 | 30 | −99.7 | −91.4 |
| Hardness, Shore A | 94 | 84 | | |

TABLE 7

| Ingredient | Example 9 | Example 10 | Example 11 | Example 12 |
|---|---|---|---|---|
| Therban ™ A3907 | 100 | 100 | — | — |
| Therban ™ VP KA 8798* | — | — | 100 | 100 |
| Dynamar ™ RC-5251Q | — | 5 | — | 5 |
| Maglite ™ D | — | — | 3 | 3 |
| Vulkanox ™ OCD/SG (ODPA) | 1 | 1 | 1 | 1 |
| Vulkanox ™ ZMB-2/C5 (ZMMBI) | 0.4 | 0.4 | 0.4 | 0.4 |
| Zinc Oxide | 3 | 3 | 3 | 3 |
| Carbon Black, N660 Sterling-V | 50 | 50 | 50 | 50 |
| Plasthall TOTM | 5 | 5 | 5 | 5 |
| Diak #7 | 1.5 | 1.5 | 1.5 | 1.5 |
| Vulcup 40KE | 6.5 | 6.5 | 7.5 | 7.5 |

*hydrogenated acrylonitrile, butadiene, unsaturated carboxylic acid ester terpolymer

TABLE 8

| Physical Properties | Example 9 | Example 10 | % Change 9 | % Change 10 |
|---|---|---|---|---|
| Unaged | | | | |
| Elongation at break | 275 | 285 | — | — |
| Hardness, Shore A | 70 | 72 | | |
| Aged 24 h @ 170° C. | | | | |
| Elongation at break | 235 | 300 | −14.5 | 13.2 |
| Hardness, Shore A | 74 | 75 | | |
| Aged 48 h @ 170° C. | | | | |
| Elongation at break | 210 | 290 | −23.6 | 9.4 |
| Hardness, Shore A | 75 | 79 | | |
| Aged 72 h @ 170° C. | | | | |
| Elongation at break | 185 | 290 | −32.7 | 9.4 |
| Hardness, Shore A | 76 | 78 | | |
| Aged 96 h @ 170° C. | | | | |
| Elongation at break | 145 | 295 | −47.3 | 11.3 |
| Hardness, Shore A | 79 | 78 | | |
| Aged 168 h @ 170° C. | | | | |
| Elongation at break | 25 | 160 | −90.9 | −40 |
| Hardness, Shore A | 88 | 81 | | |
| Aged 240 h @ 170° C. | | | | |
| Elongation at break | 40 | 165 | −85.5 | −38 |
| Hardness, Shore A | 86 | 82 | | |

TABLE 9

| Physical Properties | Example 11 | Example 12 | % Change 11 | % Change 12 |
|---|---|---|---|---|
| Unaged | | | | |
| Elongation at break | 220 | 235 | — | — |
| Hardness, Shore A | 62 | 65 | | |
| Aged 120 h @ 160° C. | | | | |
| Elongation at break | 210 | 290 | −4.5 | 23.4 |
| Hardness, Shore A | 76 | 77 | | |
| Aged 240 h @ 160° C. | | | | |
| Elongation at break | 145 | 285 | −34.1 | 21.3 |
| Hardness, Shore A | 78 | 78 | | |
| Aged 360 h @ 160° C. | | | | |
| Elongation at break | 125 | 240 | −43.2 | 2.1 |
| Hardness, Shore A | 82 | 85 | | |
| Aged 480 h @ 160° C. | | | | |
| Elongation at break | 80 | 230 | −63.6 | −2.1 |
| Hardness, Shore A | 86 | 83 | | |

TABLE 10

| Ingredient | Example |||||||
|---|---|---|---|---|---|---|---|
| | 13 | 14 | 15 | 16 | 17 | 18 | 19 |
| Therban ™ | 100 | 100 | 100 | 100 | 100 | 100 | 100 |
| Dynamar ™ RC-5251Q | 2.5 | 2.5 | 2.5 | 5 | 5 | 5 | — |
| Rhenogran ™ P-50 | — | 5 | 10 | — | 5 | 10 | — |
| Vulcanox ™ OCD/SG (ODPA) | 1 | 1 | 1 | 1 | 1 | 1 | 1 |
| Vulcanox ™ ZMB-2/C5 (ZMMBI) | 0.4 | 0.4 | 0.4 | 0.4 | 0.4 | 0.4 | 0.4 |
| Zinc Oxide | 3 | 3 | 3 | 3 | 3 | 3 | 3 |
| Carbon Black, N660 Sterling-V | 50 | 50 | 50 | 50 | 50 | 50 | 50 |
| Plasthall TOTM | 5 | 5 | 5 | 5 | 5 | 5 | 5 |
| Diak #7 | 1.5 | 1.5 | 1.5 | 1.5 | 1.5 | 1.5 | 1.5 |
| Vulcup 40KE | 6.5 | 6.5 | 6.5 | 6.5 | 6.5 | 6.5 | 6.5 |

TABLE 11

| Physical Properties | Example |||||||
|---|---|---|---|---|---|---|---|
| | 13 | 14 | 15 | 16 | 17 | 18 | 19 |
| Unaged | | | | | | | |
| Ultimate elongation | 255 | 275 | 220 | 265 | 270 | 290 | 285 |
| Hardness, Shore A | 69 | 68 | 69 | 70 | 68 | 68 | 70 |
| Aged 72 h @ 160° C. | | | | | | | |
| Ultimate elongation | 285 | 270 | 240 | 300 | 310 | 320 | 195 |
| Hardness, Shore A | 76 | 74 | 75 | 78 | 76 | 75 | 76 |
| Aged 144 h @ 160° C. | | | | | | | |
| Ultimate elongation | 280 | 260 | 240 | 310 | 290 | 310 | 170 |
| Hardness, Shore A | 78 | 74 | 74 | 74 | 75 | 76 | 77 |
| Aged 216 h @ 160° C. | | | | | | | |
| Ultimate elongation | 275 | 290 | 255 | 315 | 330 | 330 | 115 |
| Hardness, Shore A | 76 | 77 | 70 | 79 | 76 | 75 | 78 |
| Aged 336 h @ 160° C. | | | | | | | |
| Ultimate elongation | 90 | 230 | 240 | 215 | 285 | 325 | 35 |
| Hardness, Shore A | 84 | 78 | 81 | 83 | 81 | 79 | 87 |
| Aged 504 h @ 160° C. | | | | | | | |
| Ultimate elongation | 20 | 95 | 140 | 55 | 180 | 265 | 5 |
| Hardness, Shore A | 81 | 77 | 77 | 76 | 76 | 76 | 88 |
| Aged 672 h @ 150° C. | | | | | | | |
| Ultimate elongation | 10 | 45 | 125 | 25 | 100 | 200 | 1 |
| Hardness, Shore A | 91 | 86 | 85 | 88 | 85 | 84 | 92 |

TABLE 12

| Physical Properties | Example |||||||
|---|---|---|---|---|---|---|---|
| | 13 | 14 | 15 | 16 | 17 | 18 | 19 |
| Unaged | | | | | | | |
| Ultimate elongation | 255 | 275 | 220 | 265 | 270 | 290 | 265 |
| Hardness, Shore A | 69 | 68 | 69 | 70 | 68 | 68 | 70 |
| Aged 168 h @ 150° C. | | | | | | | |
| Ultimate tensile (MPa) | 20.4 | 20.6 | 17.4 | 19.8 | 20.9 | 20.8 | 25.0 |
| Ultimate elongation | 290 | 260 | 240 | 300 | 285 | 285 | 210 |
| Hardness, Shore A | 78 | 74 | 74 | 77 | 76 | 73 | 77 |
| Aged 336 h @ 150° C. | | | | | | | |
| Ultimate tensile (MPa) | 16.5 | 17.5 | 16.0 | 16.1 | 17.6 | 18.6 | 17.4 |
| Ultimate elongation | 230 | 275 | 220 | 300 | 320 | 315 | 80 |
| Hardness, Shore A | 81 | 79 | 78 | 79 | 78 | 78 | 82 |
| Aged 504 h @ 150° C. | | | | | | | |
| Ultimate tensile (MPa) | 16.6 | 17.3 | 16.0 | 15.8 | 17.3 | 18.6 | 13.4 |
| Ultimate elongation | 205 | 235 | 200 | 235 | 290 | 290 | 35 |
| Hardness, Shore A | 75 | 66 | 71 | 76 | 73 | 73 | 80 |
| Aged 1008 h @ 150° C. | | | | | | | |
| Ultimate tensile (Mpa) | 5.1 | 14.3 | 13.5 | 12.4 | 13.7 | 14.6 | 13.3 |
| Ultimate elongation | 25 | 155 | 160 | 105 | 245 | 270 | 0 |
| Hardness, Shore A | 85 | 78 | 79 | 83 | 82 | 80 | 90 |
| Aged 1512 h @ 150° C. | | | | | | | |
| Ultimate tensile (Mpa) | 4.4 | 5.8 | 9.4 | 7.6 | 10.8 | 12.3 | 3.8 |
| Ultimate elongation | 1 | 25 | 65 | 30 | 80 | 125 | 1 |
| Hardness, Shore A | 92 | 84 | 82 | 84 | 83 | 81 | 86 |
| Aged 2016 h @ 150° C. | | | | | | | |
| Ultimate tensile (MPa) | 0.5 | 5.9 | 8.8 | 5.9 | 8.8 | 10.8 | 0.1 |
| Ultimate elongation | 0 | 15 | 45 | 45 | 50 | 75 | 0 |
| Hardness, Shore A | 89 | 87 | 84 | 82 | 86 | 80 | 88 |

TABLE 13

| Ingredient | Example ||
|---|---|---|
| | 20 | 21 |
| Levapren ™ 500HV (KA8608) | 100 | 100 |
| Armeen ™ 18D | 2 | 2 |
| Dynamar ™ RC-5251Q | — | 5 |
| Maglite ™ D | 3 | 3 |
| Naugard ™ 445 | 1.1 | 1.1 |
| Stearic acid, Emersol ™ 132 NF | 1 | 1 |
| Vulkanox ™ ZMB-2/C5 (ZMMBI) | 0.4 | 0.4 |
| Zinc Oxide | 3 | 3 |
| Carbon Black, N660 Sterling-V | 50 | 50 |
| Plasthall TOTM | 5 | 5 |
| Diak #7 | 1.5 | 1.5 |
| Vulcup 40KE | 7.5 | 7.5 |

TABLE 14

| Physical Properties | Example | | % Change | |
| --- | --- | --- | --- | --- |
| | 20 | 21 | 20 | 21 |
| Unaged | | | | |
| Elongation at break | 190 | 190 | — | — |
| Hardness, Shore A | 67 | 70 | | |
| Aged 240 h @ 160° C. | | | | |
| Elongation at break | 220 | 310 | 15.8 | 63.2 |
| Hardness, Shore A | 80 | 84 | | |
| Aged 504 h @ 160° C. | | | | |
| Elongation at break | 180 | 210 | −5.3 | 10.5 |
| Hardness, Shore A | 80 | 86 | | |
| Aged 1008 h @ 160° C. | | | | |
| Elongation at break | 75 | 100 | −60.5 | −47.4 |
| Hardness, Shore A | 84 | 87 | | |

The publications, patents and/or patent applications referred to in this specification are incorporated by reference in their entirety to the same extent as if each individual publication, patent or patent application was specifically and individually indicated to be incorporated by reference in its entirety.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polymer composition comprising:
   a polymer having a main polymer chain derived from: (i) at least about 30% by weight of a first monomer which introduces at least one of a secondary carbon and a tertiary carbon to the main polymer chain, and (ii) from 0 to about 70% by weight of a second monomer; and
   a salt of a strong base and a weak acid, the salt comprising a metal selected from Group I of the Periodic Table of Elements,
   wherein the polymer main chain consists of an elastomer copolymer consisting of ethylene and propylene,
   wherein the salt of a strong base and a weak acid is selected from the group consisting of potassium carbonate, sodium carbonate, sodium or potassium salts of $C_1$ to $C_{50}$-mono, di or poly carboxylic acids, sodium phosphate, potassium phosphate and mixtures thereof,
   wherein the salt is present in the polymer composition in an amount in the range of from about 2.5 to about 7.5 parts based on phr.

* * * * *